April 1, 1924.

P. H. BRAINARD

JACKETED CONTAINER

Original Filed Dec. 29, 1921

Inventor:
Pearl H. Brainard
by Albert Scheible
Attorney

Patented Apr. 1, 1924.

1,489,059

UNITED STATES PATENT OFFICE.

PEARL H. BRAINARD, OF MACOMB, ILLINOIS.

JACKETED CONTAINER.

Application filed December 29, 1921, Serial No. 525,788. Renewed January 5, 1924.

*To all whom it may concern:*

Be it known that I, PEARL H. BRAINARD, citizen of the United States, residing at Macomb, Illinois, have invented certain new and useful Improvements in a Jacketed Container; and I do hereby declare the following to be a full, clear, and exact description of the invention, such as will enable others skilled in the art to which it appertains to make and use the same.

My invention relates to thermally insulated containers suitable for the storing of liquid or solid foods, or of other objects which are to be kept at a temperature differing from that of the surrounding air, its general objects being those of providing an unusually simple and inexpensive construction and one which will readily permit the interior of the container to be maintained in a highly sanitary condition. Furthermore, my invention aims to provide a construction which will readily permit the storage receptacle of the container to be made of pottery in the form of earthenware, porcelain or the like, so as to secure the advantages of the low thermal conductivity of such a material, combined with the strength and durability of the same and the ease with which its interior may be kept in a highly sanitary condition. Furthermore, my invention aims to provide unusually simple, inexpensive and effective means for securing the outer casing of a jacketed container to an inner receptacle of potteryware in such a manner as to afford adequate support for the latter and so as to afford a proper sealing of its juncture with the same. Still further and more detailed objects will appear from the following specification and from the accompanying drawings, in which—

Figure 1:
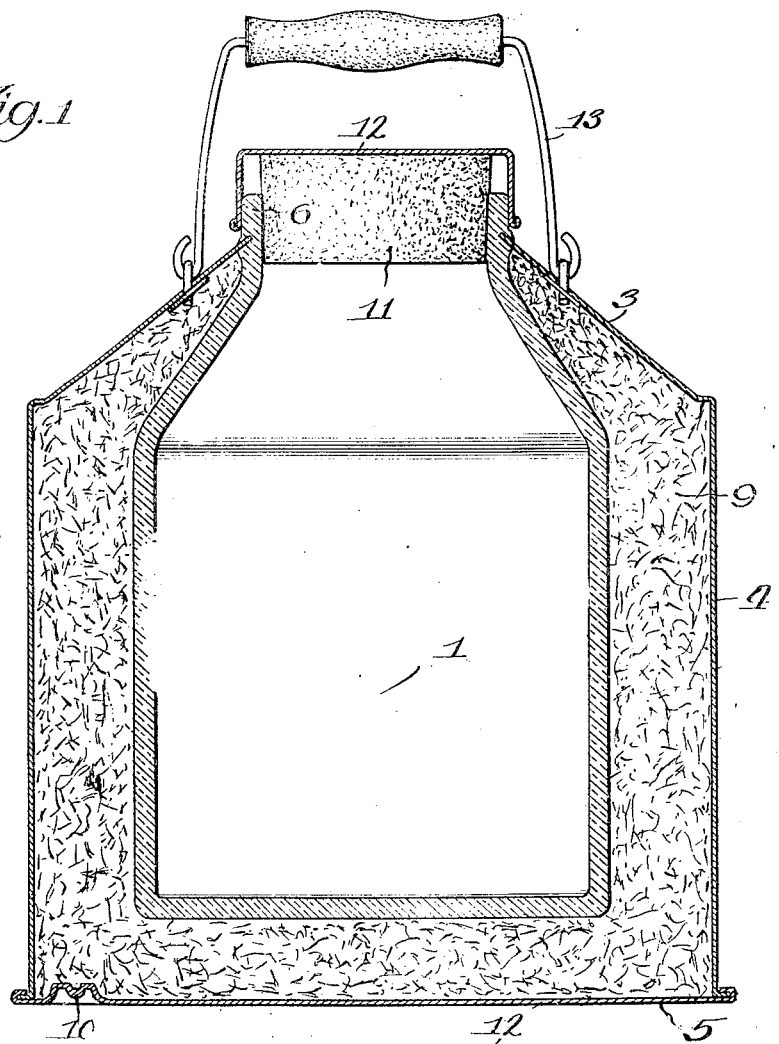
Fig. 1 is a central and vertical section through a jacketed container embodying my invention.
Figure 2:
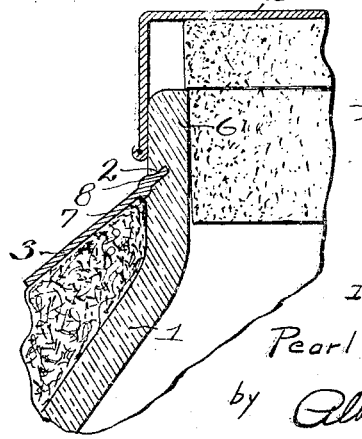
Fig. 2 is an enlargement of a part of the mouth portion of the same, showing the arrangement of the supporting connection and of the seal between the container proper and the casing of the jacket.

In the embodiment of Figs. 1 and 2, the receptacle portion (or container proper) of my invention consists of a jar 1, desirably made of earthenware or pottery having a wall of considerable thickness and glazed both on its inner and outer surfaces. Adjacent to its mouth, this receptacle 1 has a peripheral groove 2, which groove desirably slopes upward from the exterior of the receptacle and conforms substantially in its slope to the frusto-conical top 3 of the outer casing of the container. This outer casing is desirably made of metal with its main cylindrical wall portion 4 integral with the said tapering top portion 3, so as to avoid the necessity of sealing any joints between the two. However, the bottom 5 of the outer casing is desirably made of a separate piece and preferably is not only seamed over the lower edge of the side wall 4 into tight clinching relation to the latter, but also soldered or welded to the latter so as to afford an air-tight joint.

In assembling these main casing portions, the neck 6 of the earthenware or porcelain jar is slipped through the neck of the top 3 of the outer casing and this latter neck is then forcibly contracted into the groove 2, as by spinning the same into the said groove. Then the inserted portion of the top 3 is sealed into the groove by a filling 7 of a suitable air-tight cement introduced inside the metal casing and by a corresponding cement portion 8 applied from the outside of the latter. This cement is pressed into the groove so as to afford an air-tight joint between the casing portion 3 and the neck of the receptacle when the cement hardens.

After this has been done and before the bottom 5 is affixed to the casing, the said assembled portions are turned upside down and suitable steps are taken for reducing the conduction of heat between the receptacle and the outer casing. For this purpose, the intervening space is desirably filled with a suitable heat-insulating material 9 of thoroughly dried granulated cork or the like, after which the bottom 5 of the casing is attached to the side wall 4 and tightly sealed to the latter. If desired, air may be exhausted from the said space and from the pores of the cork or other filling also, by attaching a pump through an opening in the bottom 5, which opening is afterwards sealed as shown at 10 in Fig. 1. However, I have found in practice that even without producing a vacuum in the jacket of my device, I can obtain a heat-insulation which will retard the interchange of temperature between the exterior and interior of the receptacle sufficiently for ordinary commercial or household purposes. That is to say, the well known poor heat conductivity of the earthenware or porcelain cooperates with the means employed within the jacket (namely the cork filling, vacuum, or both thereof) in retarding such an interchange of heat. Consequently, I can maintain boiling water uncomfortably hot within the receptacle for ten or fifteen hours in cold weather, or can keep ice water with ice still floating in the same for a similar period on a hot summer day, and I can likewise keep ice-cream in proper condition for the same length of time.

Owing to the relatively small surface of the juncture between the metal casing and the inner receptacle, the direct heat conductivity from one to the other is kept quite low, and the interchange of heat at this point is desirably further retarded by employing a closure for the receptacle including a stopper 11 which extends below the groove 2 and which therefore prevents a conduction of heat along the shortest horizontal path from the neck of the metal top 3 of the outer casing to the bore of the neck 6 of the receptacle. If desired, this stopper may be covered by a suitable ornamental cap 12, and for most purposes I desirably equip the outer casing with a suitable handle 13 by which the entire appliance may be carried about.

Figure 3:
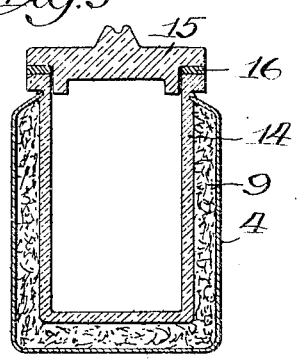
Fig. 3 is a similar section through another embodiment of my invention, namely one in which the container proper has a cylindrical bore and in which its mouth is closed by a gasketed cap after the manner employed in fruit jars.

However, I do not wish to be limited to these or other details of the construction and arrangement above described, nor to the particular shapes or uses heretofore mentioned, it being obvious that wide variations might be made without departing from the spirit of my invention or from the appended claims. For example, Fig. 3 shows an embodiment of the same in which the container 14 has an entirely cylindrical bore, thus facilitating the scooping of ice cream or the like from the same, and which has a glass cover 15 fitted with a rubber gasket 16 engaging the top of the mouth of the container. In other words, any desired form of inner containers may be advantageously employed, such as jars, jugs, carafes and the like, it being obviously unnecessary to illustrate them all.

I claim as my invention:

1. A jacketed container comprising a glazed jar or jug having a peripheral groove near its mouth, and a metal casing having its mouth portion sealed into the said groove, the casing being otherwise freely spaced from the jar or jug.

2. A jacketed container comprising an outer metal casing having a contracted upper end, a receptacle of pottery ware housed thereby and extending for a relatively short part of its length beyond the upper end of the metal casing, the receptacle and the casing having relatively interengaging formations for preventing movement of a receptacle with respect to the casing in all directions, the said formations supporting the receptacle within the casing in otherwise freely spaced disposition, and means for hermetically sealing the joint between the receptacle and the casing at their said interengaging formations.

3. A jacketed container comprising an earthenware jar or jug glazed on its interior, and a metal casing having its mouth contracted into embracing relation to the said jar or jug and sealed thereto, the metal casing being otherwise freely spaced from the jar or jug.

4. A jacketed container comprising an earthenware jar or jug glazed on its interior, and a metal casing having its mouth contracted into embracing relation to the said jar or jug and sealed thereto, and a heat-insulating filler in the space between the jar or jug and the casing, the mouth of the casing being interlocked with the jar or jug to hold the latter in fixed relation with respect to the casing independently of any supporting action of the filler.

5. A jacketed container comprising an outer metal casing having a frusto-conical upper end, and an inner receptacle of pottery ware having adjacent to its mouth a groove corresponding substantially in slope to that of the frusto-conical casing end and entered by the mouth portion of the latter, the said end being sealed into the said groove and the inner receptacle being otherwise spaced from the outer casing, there being means for retarding the conduction of heat through the space between the said receptacle and casing.

6. A jacketed container comprising an outer metal casing having a frusto-conical upper end, and an inner receptacle of pottery ware having adjacent to its mouth a groove entered by the said upper end portion of the casing, the said end being sealed into the said groove and the inner receptacle being otherwise spaced from the outer casing, the inner receptacle having moisture impervious inner and outer surfaces.

Signed at Macomb, Illinois, Dec. 10, 1921.

PEARL H. BRAINARD.